(12) United States Patent
Desai et al.

(10) Patent No.: US 11,023,720 B1
(45) Date of Patent: Jun. 1, 2021

(54) DOCUMENT PARSING USING MULTISTAGE MACHINE LEARNING

(71) Applicant: Workday, Inc., Pleasanton, CA (US)

(72) Inventors: Milan Desai, Redwood City, CA (US); Vivien Leong, San Mateo, CA (US); Vivek Srivastava, San Ramon, CA (US); Xuan Tan, Fremont, CA (US); Sergei Winitzki, San Francisco, CA (US); Yunxing Zhang, Fremont, CA (US)

(73) Assignee: Workday, Inc., Pleasanton, CA (US)

( * ) Notice: Subject to any disclaimer, the term of this patent is extended or adjusted under 35 U.S.C. 154(b) by 103 days.

(21) Appl. No.: 16/175,615

(22) Filed: Oct. 30, 2018

(51) Int. Cl.
| | | |
|---|---|---|
| *G06K 9/00* | (2006.01) | |
| *G06N 3/04* | (2006.01) | |
| *G06F 40/258* | (2020.01) | |
| *G06F 40/295* | (2020.01) | |

(52) U.S. Cl.
CPC ....... *G06K 9/00449* (2013.01); *G06F 40/258* (2020.01); *G06F 40/295* (2020.01); *G06K 9/00456* (2013.01); *G06K 9/00463* (2013.01); *G06N 3/0454* (2013.01)

(58) Field of Classification Search
CPC .......... G06K 9/00449; G06K 9/00456; G06K 9/00463; G06F 40/295; G06F 40/258; G06N 3/0454
See application file for complete search history.

(56) References Cited

U.S. PATENT DOCUMENTS

| | | | |
|---|---|---|---|
| 8,861,861 B2 | 10/2014 | Barrett | |
| 10,423,827 B1* | 9/2019 | Wu | G06K 9/00463 |
| 10,445,569 B1* | 10/2019 | Lin | G06F 40/279 |
| 2006/0230004 A1* | 10/2006 | Handley | G06K 9/00469 |
| | | | 706/12 |
| 2012/0330971 A1 | 12/2012 | Thomas | |
| 2013/0058575 A1* | 3/2013 | Koo | G06K 9/4652 |
| | | | 382/176 |
| 2016/0148074 A1* | 5/2016 | Jean | G06K 9/4671 |
| | | | 382/190 |
| 2018/0137351 A1* | 5/2018 | Hopen | G06K 9/325 |
| 2019/0349489 A1* | 11/2019 | Inagaki | H04N 1/00403 |
| 2019/0385054 A1* | 12/2019 | Zuev | H04N 1/00 |

OTHER PUBLICATIONS

Author Unknown, Rochelle on Twitter, from https://twitter.com/Rochelle/status/933515448741535744 , captured Jul. 9, 2018.
Thuy Ong, "Expensify says receipts found on Amazon Turk were from testing a new feature", from https://www.theverge.com/2017/11/28/16703962/expensify-receipts-amazon-turk-privacy-controversy, Nov. 28, 2017.

\* cited by examiner

*Primary Examiner* — Dhaval V Patel
(74) *Attorney, Agent, or Firm* — Van Pelt, Yi & James LLP

(57) ABSTRACT

A system for document parsing includes an interface and a processor. The interface is configured to receive an image. The processor is configured to determine text boxes. Determining text boxes uses multiple zoom levels of the image. The processor is further configured to determine labels from the strings and provide the labels.

21 Claims, 9 Drawing Sheets

300

Department Store

6/14/2018

Fairview TX
75069-1640

---

Mauss 514 Rigid     520/4404/015312

42.99

Subtotal     42.99
Sales Tax    8.2500%     3.55

Total Items Sold: 1
Total Items Returned: 0

---

Total     46.54

Fig. 3

DOCUMENT PARSING USING MULTISTAGE MACHINE LEARNING

BACKGROUND OF THE INVENTION

A business database system utilizes optical character recognition (OCR) for a wide range of document types. For non-typically structured documents (e.g., invoices, receipts, etc.), traditional OCR techniques do not work reliably. In addition, traditional OCR techniques are best suited for images of text captured in controlled environments (e.g., a scanner or fixed camera aligned to the page). For text imaged in a less controlled environment (e.g., a quick handheld camera photo) the potential for angle and irregularity is too great for traditional OCR techniques much the less for parsing the meaning from those text images. However, business database system customers desire the functionality of entering a receipt into the database system by simply taking a smartphone photo creating a problem that requires a more adaptable document parsing technique. In addition, typical systems for OCR rely on training for specific fields of use making the systems highly specialized each with their own training requirements so that many different systems are required to be used if multiple types of fields are desired to be addressed.

BRIEF DESCRIPTION OF THE DRAWINGS

Various embodiments of the invention are disclosed in the following detailed description and the accompanying drawings.

FIG. 3 is a diagram illustrating an embodiment of an image of a receipt.

DETAILED DESCRIPTION

Figure 1:
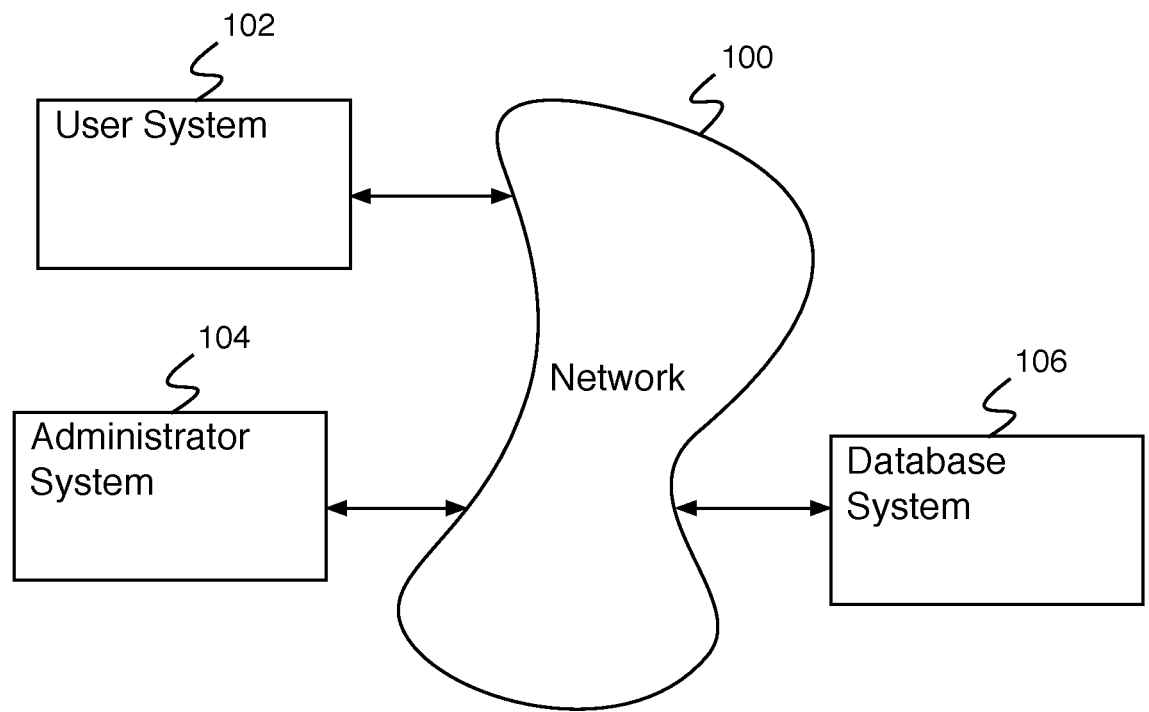
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for document parsing comprises an interface configured to receive an image, and a processor configured to determine text boxes, wherein determining text boxes uses multiple zoom levels of the image, to determine strings from the text boxes, wherein determining strings using a multiple level output design, to determine labels from the strings, and to provide the labels. The system for document parsing additionally comprises a memory coupled to the processor and configured to provide the processor with instructions.

A system for document parsing comprises a system for identifying text from images of unstructured documents. For example, unstructured documents comprise documents including text that is not arranged in a set of lines (e.g., including text chunks placed in isolation at different locations within the document), text of different sizes, text of different fonts, text aligned at different angles (e.g., with respect to the document edge), etc. The system for document parsing operates in three stages, each stage performed by one or more algorithms. The first stage identifies text boxes in the document, the second stage identifies the text in each text box, and the third stage applies labels to the identified text.

In some embodiments, the first stage of the system for document parsing comprises a neural network (e.g., a multilayer convolutional neural network) for text box detection. The neural network takes an image as input and processes the image to determine a set of text boxes. The image is processed at multiple resolutions (e.g., at full resolution, at one half resolution, and at one quarter resolution), and a set of text boxes is determined at each resolution. For example, larger or smaller text boxes are more easily detected from images of different resolutions. A set of text box parameters is determined for each text box. For example, the set of text box parameters comprises the x and y coordinates of the center of the text box, the height of the text box, the width of the text box, the cosine of the text box rotation, the sine of the text box rotation, and confidence probability of it being a text box. The cosine of the text box rotation and the sine of the text box rotation are not independent, and a goodness of fit (e.g., of the neural network decisioning) is determined based at least in part on the correspondence of the two measures. For example, the goodness of fit is determined as the closeness to one of the sum of the square of the cosine of the text box rotation and the square of the sine of the text box rotation. Text boxes determined at different zoom levels are mapped to a common scale (e.g., so they can be directly compared).

In some embodiments, the second stage then takes the image sections that were identified by the bounding boxes and then inputs each to a text recognition algorithm. The text recognition algorithm comprises a convolutional neural network. For example, the second stage text recognition algorithm comprises a design including a set of stages of residual blocks, wherein each of the blocks performs a set of dilated convolution passes with increasing dilated stride fashion. Each block comprises one or more weighting factors comprising a neural network model. The text recognition algorithm is run multiple times utilizing different neural network models (e.g., utilizing a multiple level output design). Characters within the bounding boxes are determined using these different neural network models. A set of words is thus determined, each word comprising a determination of a word represented by an image text element in the original image. The maximum number of words determined per image text element comprises the product of the number of resolutions used in the text box determination and the number of neural network models used in the word determination. Determination of a smaller number of words is possible in the event that an additional processing step detects and merges some overlapping text boxes, or eliminates low confidence text boxes.

In some embodiments, the third phase the system performs word level parsing on the set of words determined to be represented by the image sections. A machine learning model is used, wherein the total set of words associated with the original image are input to the model and a label is assigned to each word. For example, in the case of an algorithm for parsing receipts, the potential labels are amount, date, merchant, and none. For some applications each detected word is assigned a label of a set of labels, for other applications, each label of a set of labels is assigned to a word (e.g., and other words receive no label). In the event the model has difficulty coming to a clear conclusion (e.g., two label are determined for a word with similar confidence, or two words are determined for a label with similar confidence), a determination is made by a vote, a heuristic, a rule, or in any other appropriate way.

The system for document parsing advances the state of the art by improving the quality of text recognition. The system uses a specific ordered set of steps including three levels of processing including: text box detection, text recognition, and character/word level parsing. The system greatly improves a computer system over the performance of a typical optical character recognition (OCR) system in determining results when processing unstructured documents (e.g., receipts). The system especially improves a general computation system in that it leverages both word level classification and character level classification going beyond optical character recognition to make a more complex system that includes word classification and character classification not just optical character recognition.

The system also is improves a general computation system in that it reduces the overhead in development efforts for a new document parsing application. The system reduces investment in retraining models when there is a new field (e.g., in other words when traditional OCR needs to be performed on address field vs. a company name field vs. skill portion of a resume vs. business card scan vs. a payslip, etc. significant retraining or hand tuning is necessary).

In some embodiments, the system includes multiple stages of repeated blocks (e.g., three stages of five blocks), where each block includes multiple stacked layers that perform convolutions with increasing dilated strides (e.g., where the blocks have increasing dilated strides 1, 2, 4, 8, and 16 pixel widths). In some embodiments, the system performs word level characterization in addition to character level classification enabling better word level representation even on words not previously presented to the model. In some embodiments, the system's convolutional network is smaller and faster than recurrent neural networks of competing models. The generalized model is able to handle multiple fields in a single model rather than needing a separate, hand-crafted or retrained model for each individual field. As a result, the system would require a single model to be trained for a receipt that might have separate fields for subtotal, tax amount, total amount, city, transaction date, and merchant name that would traditionally have required six separate models to be trained, one for each field The generalized model is able to handle all input types without specialized training or configuration—for example, the system is able to perform document parsing in various fields such as the financial fields and human resource fields including receipts, invoices, contracts, documents, automatic question and answer forms, etc.

In some embodiments, the combined character and word level classifiers enables using the best of each in order to properly identify characters/strings/words by employing a specific architecture including three stages (e.g., a text box stage, character/word classification stage, and a word-level parsing stage). In some embodiments, each part of the system has a misclassification rate, however small it might be. So, for example, in a case where the system reads Walmart as Walmart (e.g., the number '1' as opposed to the letter '1') before the parser (e.g., the last stage of the system), a character level classification is able to recover from the number '1' whereas a word level would see the entire word as completely different. In other cases, a word level classifier might outperform the character level classifier because the word level classifier requires less data compared to a character level classifier. By having both, the system can out perform both a character model by itself or a word model by itself. The system is therefore an improvement over a typical computer system for optically recognizing characters/words/strings.

FIG. 1 is a block diagram illustrating an embodiment of a network system. In some embodiments, the network system of FIG. 1 comprises a network system for a system for document parsing. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, administrator system 104, and database system 106 communicate via network 100. User system 102 comprises a user system for use by a user. For example, user system 102 comprises a desktop computer, a laptop computer, a tablet computer, a smartphone, etc. User system 102 stores and/or accesses data on database system 108. A user uses a user system 102 to interact with database system 106—for example, to store database data, to request database data, to create a report based on database data, to create a document, to access a document, to execute a database application, etc. A user uses a user system to provide an image (e.g., an image captured on a local camera, an image captured using a cellular phone, an image captured using a digital camera, etc.) for document parsing. Administrator system 104 comprises an administrator system for use by an administrator. An administrator utilizes administrator system 104 to administrate a network system—for example, installing applications, configuring applications, configuring operating systems, modifying user privileges, etc. Database system 106 comprises a database system for storing data, providing data, executing database applications, preparing reports, etc. Database system 106 comprises a document parsing system for processing images to determine data.

For example, a document parsing system of database system 106 comprises a system for receiving images from user system 102 (e.g., a smartphone camera image of a receipt from a merchant) and determining data (e.g., transaction data describing a transaction date, a transaction merchant, a transaction amount, etc.). Database system 106 comprises a system for document parsing, comprising an interface configured to receive an image. The system for document parsing additionally comprises a processor configured to determine text boxes (e.g., within the image), wherein determining text boxes uses multiple zoom levels of the image, determine strings from the text boxes, wherein determining strings uses a multiple level output design, determine labels from the strings, and provide the labels. In various embodiments, the document parsing system comprises part of database system 106, part of user system 102, part of another system, a standalone system, part of a cloud-based server, or any other appropriate system.

Figure 2:
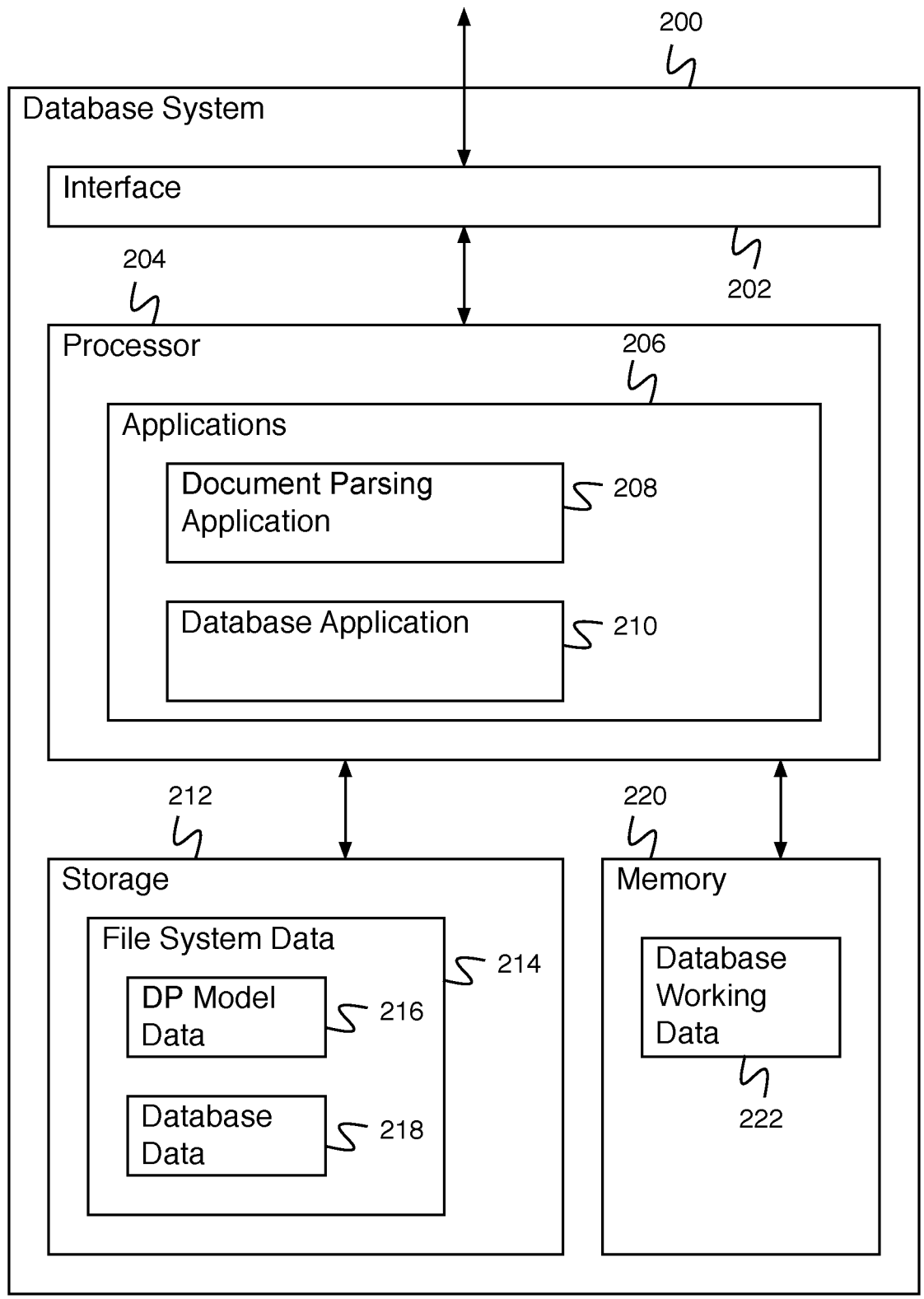
FIG. 2 is a block diagram illustrating an embodiment of a database system.

FIG. 2 is a block diagram illustrating an embodiment of a database system. In some embodiments, database system 200 comprises database system 106 of FIG. 1. In the example shown, database system 200 comprises interface 202. Interface 202 comprises an interface for communicating with external systems using a network. For example, interface 202 comprises an interface for communication with a user system (e.g., for receiving an indication to retrieve data, for providing data, for receiving an indication to execute an application, for receiving an image for document parsing, for providing document parsing results, etc.). Processor 204 comprises a processor for executing applications. Processor 204 comprises applications 206. Applications 206 comprise document parsing application 208 and database application 210. For example, applications 206 comprise any other appropriate applications (e.g., a communications application, a chat application, a web browser application, a document preparation application, a data storage and retrieval application, a user interface application, a data analysis application, etc.).

Document parsing application 208 comprises an application for identifying text in images. For example, document parsing application 208 comprise an application for receiving an image, determining text boxes, wherein determining text boxes uses multiple zoom levels of the image, determining strings from the text boxes, wherein determining strings uses a multiple level output design, determining labels from the strings, and provide the labels. Document parsing application 208 utilizes machine learning, neural networks, artificial intelligence, rule-based decision-making processes, or any other appropriate determination techniques.

Database system 200 additionally comprises storage 212. Storage 212 comprises a data storage for storing data. Storage 212 comprises file system data 214 comprising document parsing (DP) model data 216 (e.g., model data describing machine learning models, neural network models, etc. for document parsing application 208). File system data 214 additionally comprises database data 218 comprising (e.g., human resources system database data, financial database data, etc.). Database system 200 additionally comprises memory 220 comprising database working data 222. Database working data 222 comprises a working data model for the database data (e.g., an object tree).

FIG. 3 is a diagram illustrating an embodiment of an image of a receipt. In some embodiments, image 300 of FIG. 3 comprises an image of a receipt captured by a user using a user system (e.g., user system 102 of FIG. 1). In the example shown, image 300 comprises a set of image text elements. For example, image 300 comprises text indicating a merchant name (e.g., "Department Store"), a transaction date (e.g., "6/4/2018"), a transaction city (e.g., "Fairview TX"), a transaction zip code (e.g., "75069-1640"), a transaction item name (e.g., "Mauss 514 Rigid"), a transaction item product code (e.g., "520/4404/015312"), a transaction item cost (e.g., "42.99"), a transaction subtotal indicator (e.g., "Subtotal"), a transaction subtotal (e.g., "42.99"), a transaction sales tax indicator (e.g., "Sales Tax"), a transaction sales tax amount (e.g., "8.2500%"), a transaction sales tax total (e.g., "3.55"), a transaction items sold summary (e.g., "Total Items Sold: 1"), a transaction items returned summary (e.g., "Total Items Returned: 0"), a transaction total indicator (e.g., "Total"), and a transaction total amount (e.g., "46.54"). For example, image 300 is provided by the user system to a document parsing system for document parsing. In addition to identifying the text of image 300, the document parsing system identifies a subset of the fields. For example, the document parsing system identifies the merchant name, the transaction date, and the transaction total amount.

Figure 4:
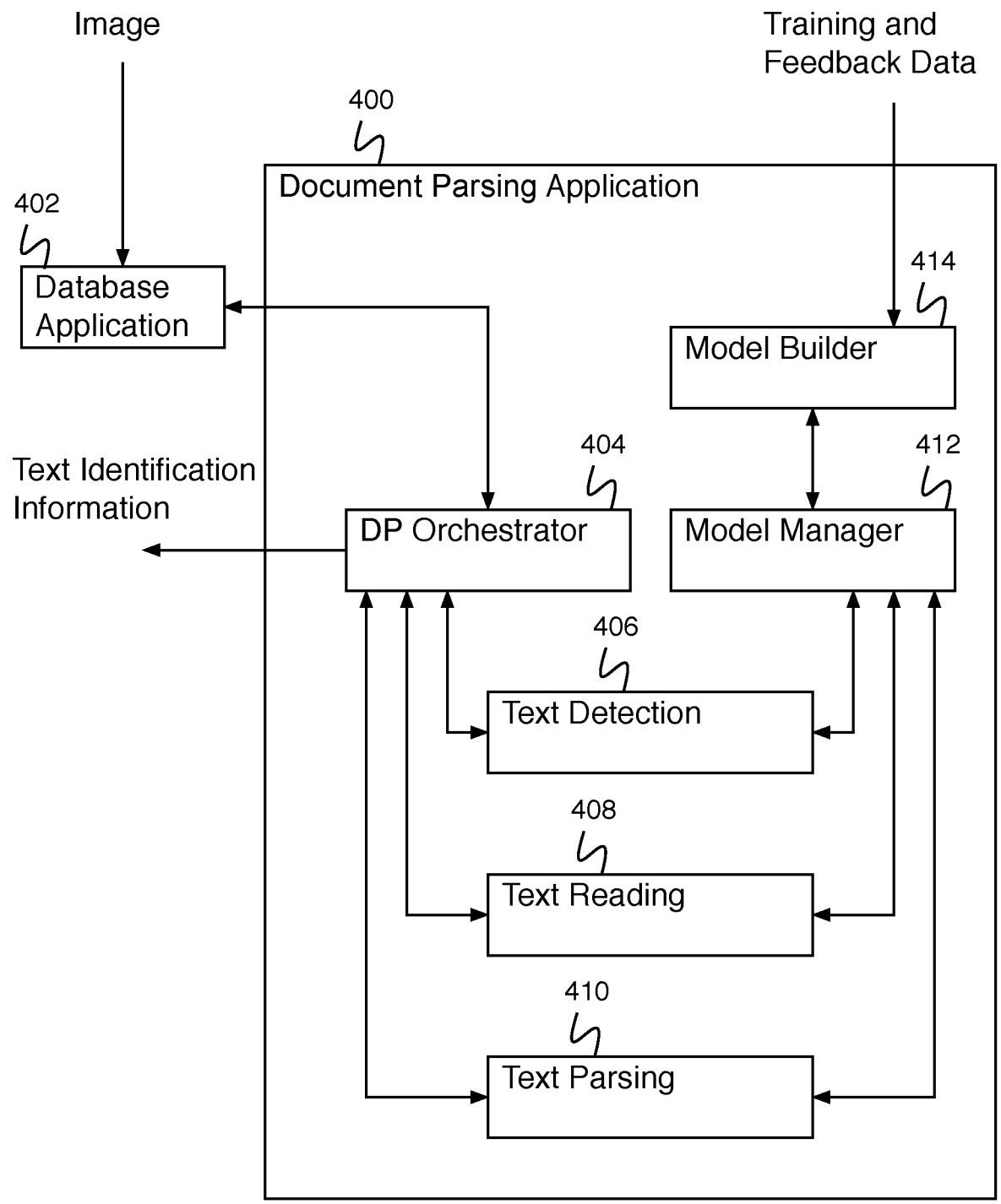
FIG. 4 is a block diagram illustrating an embodiment of a document parsing application.

FIG. 4 is a block diagram illustrating an embodiment of a document parsing application. In some embodiments, document parsing application 400 comprises document parsing application 208 of FIG. 2. In the example shown, document parsing application 400 communicates with database application 402. For example, a user using a user system provides an image to a database system, where it is received and stored by database application 402. In the event the user provides an indication to perform document parsing on the image, database application 402 provides the image to document parsing application 400, where it is received by document parsing (DP) orchestrator 404. DP orchestrator 404 comprises a process orchestration system for providing data to a series of processes for a document parsing process. DP orchestrator 404 provides the image to text detection 406. Text detection 406 comprises a system for locating text within an image. For example, text detection 406 comprises a neural network, a machine learning system, a rule-based system, etc. DP orchestrator 404 receives text box data from text detection 406. For example, text box data comprises text box center location data, text box width data, text box height data, text box angle data, or any other appropriate text box data. Text box data comprises text box data describing any appropriate number of text boxes located within the image. DP orchestrator 404 receives text box data and determines a set of image fragments representing the portions of the received image corresponding to the text boxes. DP orchestrator 404 provides the image fragments to text reading 408. Text reading 408 comprises a system for identifying text within an image fragment. For example, text reading 408 comprises a neural network, a machine learning system, a rule-based system, etc. Text reading 408 provides text data to DP orchestrator 404. For example, text data comprises a series of text fragments, each text fragment associated with one image fragment. DP orchestrator 404 provides the text fragments to text parsing 410. DP orchestrator 404 additionally provides any other appropriate data to text parsing 410 (e.g., image fragment data, text box data, etc.). Text parsing 410 comprises a system for applying labels comprising text identification information to text fragments. For example, text parsing 410 comprises a neural network, a machine learning system, a rule-based system, etc. Text parsing 410 provides labels to DP orchestrator 404. DP orchestrator 404 provides the text identification information to the requesting system.

In the example shown, text detection 406, text reading 408, and text parsing 410 comprise model-based systems. For example, systems utilizing a machine learning model, a neural network model, etc. One or more models are built using training data and improved using feedback data. Training data and feedback data are received by model builder 414. Model builder 414 builds new or improved models and provides the models to model manager 412. Text detection 406, text reading 408, and text parsing 410 access models stored by model manager 412.

Figure 5:
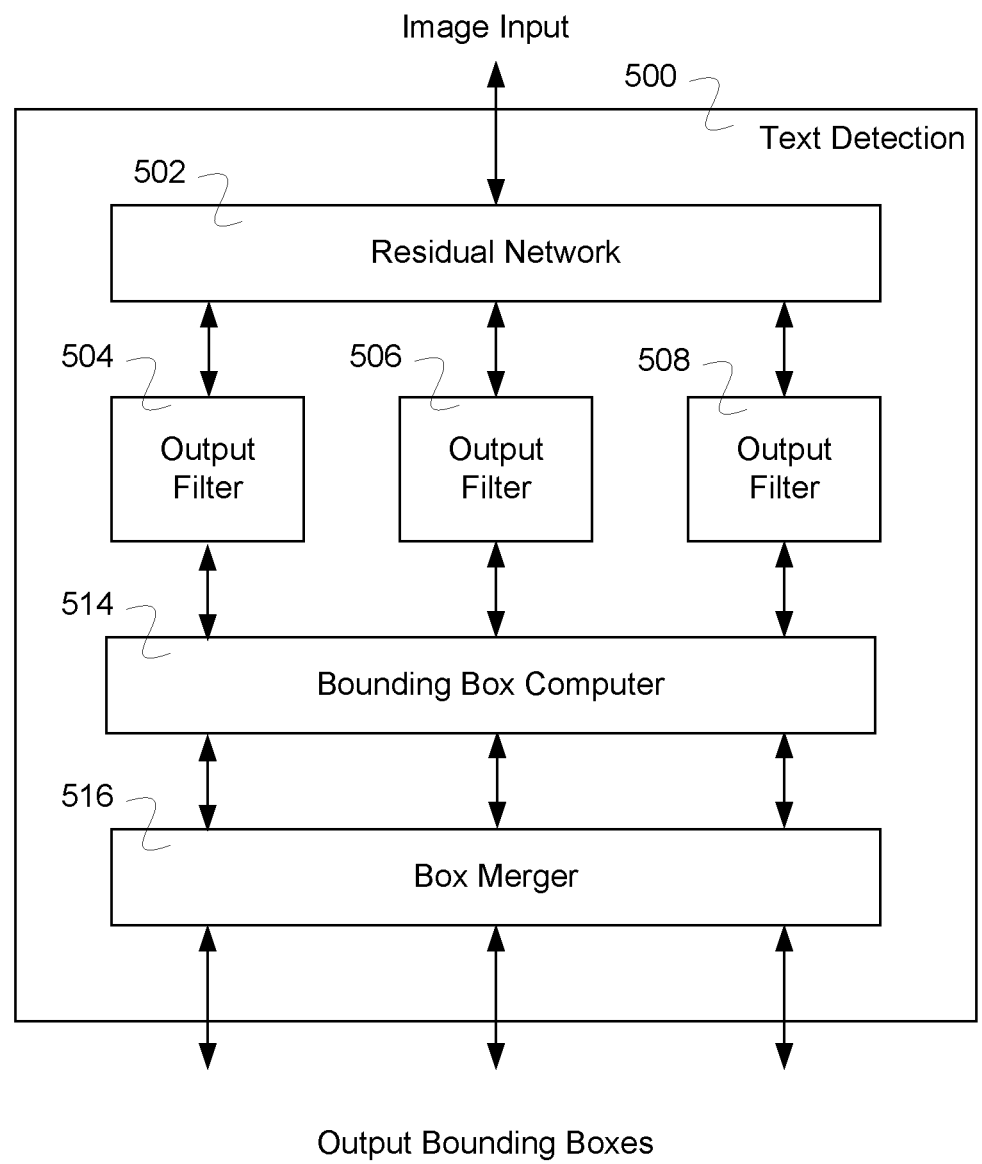
FIG. 5 is a block diagram illustrating an embodiment of a system for text detection.

FIG. 5 is a block diagram illustrating an embodiment of a system for text detection. In some embodiments, text detection 500 comprises text detection 406 of FIG. 4. In the example shown, text detection 500 comprises residual network 502. Residual network 502 comprises a series of convolutional filters for processing the image data. For example, residual network 502 comprises a series of convolutional filters with increasing resolution. Three network taps are output from residual network 502, for example, at three different points within the series of convolutional filters. Data output by network tap 1 comprises data at a first (e.g., lower) resolution, data output by network tap 2 comprises data at a second (e.g., moderate) resolution, and data output by network tap 3 comprises data at a third (e.g., higher) resolution. In some embodiments, utilizing data output by the three network taps comprises using three zoom levels. In some embodiments, the three zoom levels comprise full resolution, one half resolution, and one quarter resolution. In some embodiments, the three zoom levels comprise full resolution, a scaled up resolution, and a scaled down resolution. Data output by each of the three network taps is processed by an output filter (e.g., data output at network tap 1 is processed by output filter 504, data output at network tap 2 is processed by output filter 506, and data output at network tap 3 is processed by output filter 508). Output filter 504 comprises a first (e.g., larger) scale, output filter 506 comprises a second (e.g., moderate) scale, and output 508 comprises a third (e.g., smaller) scale. Data output by output filter 504, output filter 506, and output filter 508 comprises data describing text bounding boxes (a box center location, a box height, a box width, a box angle, etc.). In some embodiments, the neural network system is trained to determine two metrics describing the orientation of the text box (e.g., the sine of the angle of the text box and the cosine of the angle of the text box), and to determine a goodness of fit based at least in part on the correspondence of the two metrics (e.g., whether the sine of the angle of the box and the cosine of the angle of the box correspond to the same angle). Bounding box computation 514 calculates bounding boxes from the data describing the bounding boxes (e.g., bounding boxes at the different scale sizes). Box merger 516 merges boxes (e.g., at the different scale sizes) that overlap by more than a threshold amount. The resulting output bounding boxes are provided to the document parsing (DP) orchestrator.

Figure 6:
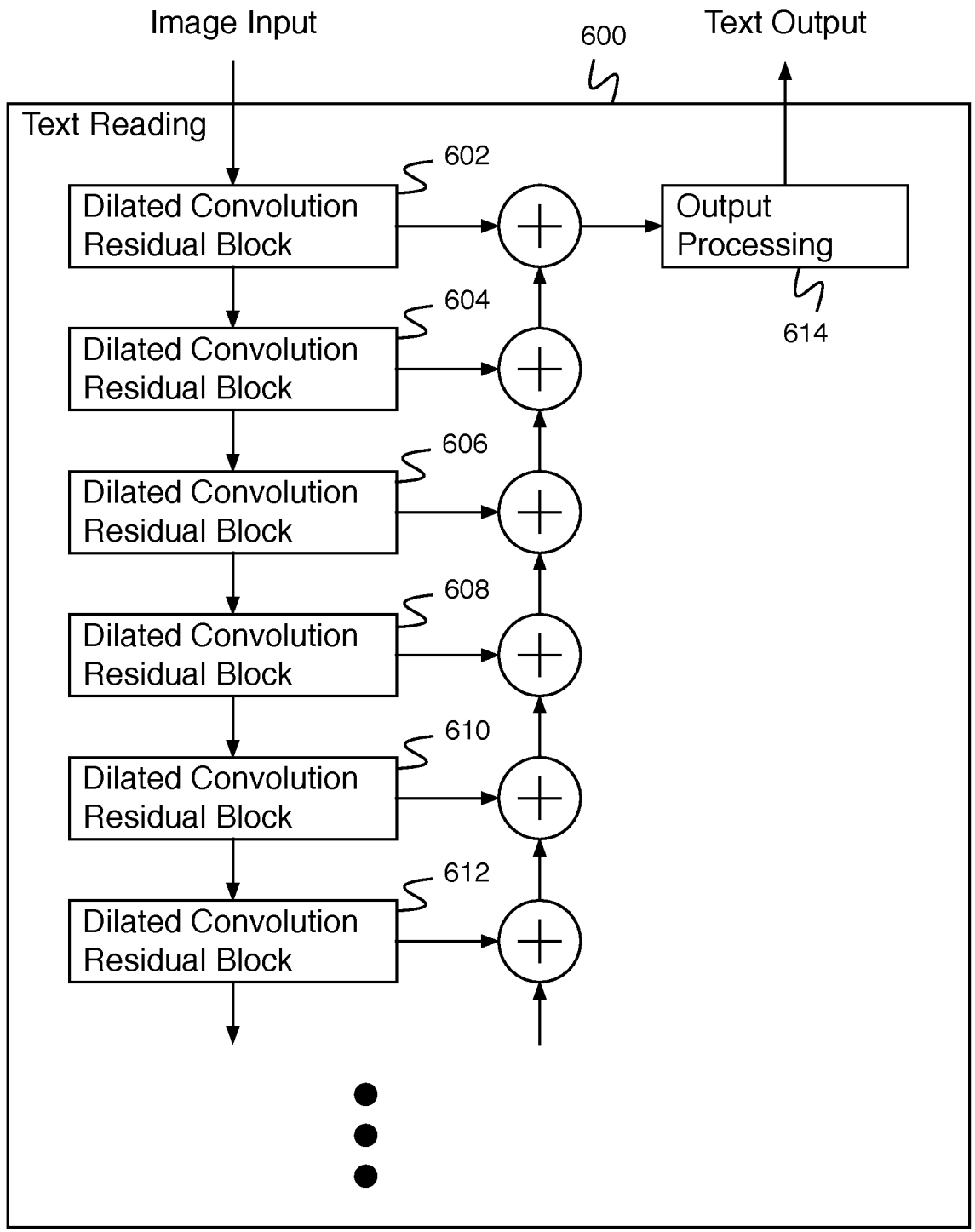
FIG. 6 is a block diagram illustrating an embodiment of a system for text reading.

FIG. 6 is a block diagram illustrating an embodiment of a system for text reading. In some embodiments, the system for text reading implements text reading 408 of FIG. 4. In the example shown, an image is received by text reading 600 and processed by dilated convolution residual block 602. Dilated convolution residual block 602 processes the image data (e.g., by performing convolution and filtering) and provides the processed data to dilated convolution residual block 604. Dilated convolution residual block 604 processes the image data (e.g., by performing convolution and filtering) and provides the processed data to dilated convolution residual block 606. Dilated convolution residual block 606 processes the image data (e.g., by performing convolution and filtering) and provides the processed data to dilated convolution residual block 608. The process continues through any appropriate number of dilated convolution residual blocks (e.g., through dilated convolution residual block 610 and dilated convolution residual block 612, etc.). The outputs from all dilated convolution residual blocks are summed and provided to output processing 614. Output processing comprises filtering, convolution, resolution changes, etc.

Each dilated convolution residual block comprises a dilation parameter. A dilation parameter indicates the dilation of the convolution. A dilated convolution residual block with dilation parameter 1 performs convolution on every data sample of a data stream, a dilated convolution residual block with dilation parameter 2 performs convolution on every other data sample of a data stream, a dilated convolution residual block with dilation parameter 4 performs convolution on every fourth sample of a data stream, etc. In the example shown, the dilation parameters of successive blocks increase exponentially (e.g., 1, 2, 4, 8, 16, etc.) until a maximum is reached, and then repeat the sequence a set number of times (e.g., 3 times). A model for the system for text reading comprises a parameter or set of parameters for each dilated convolution residual block—for example, a weight for the dilated convolution residual block before summation.

Figure 7:
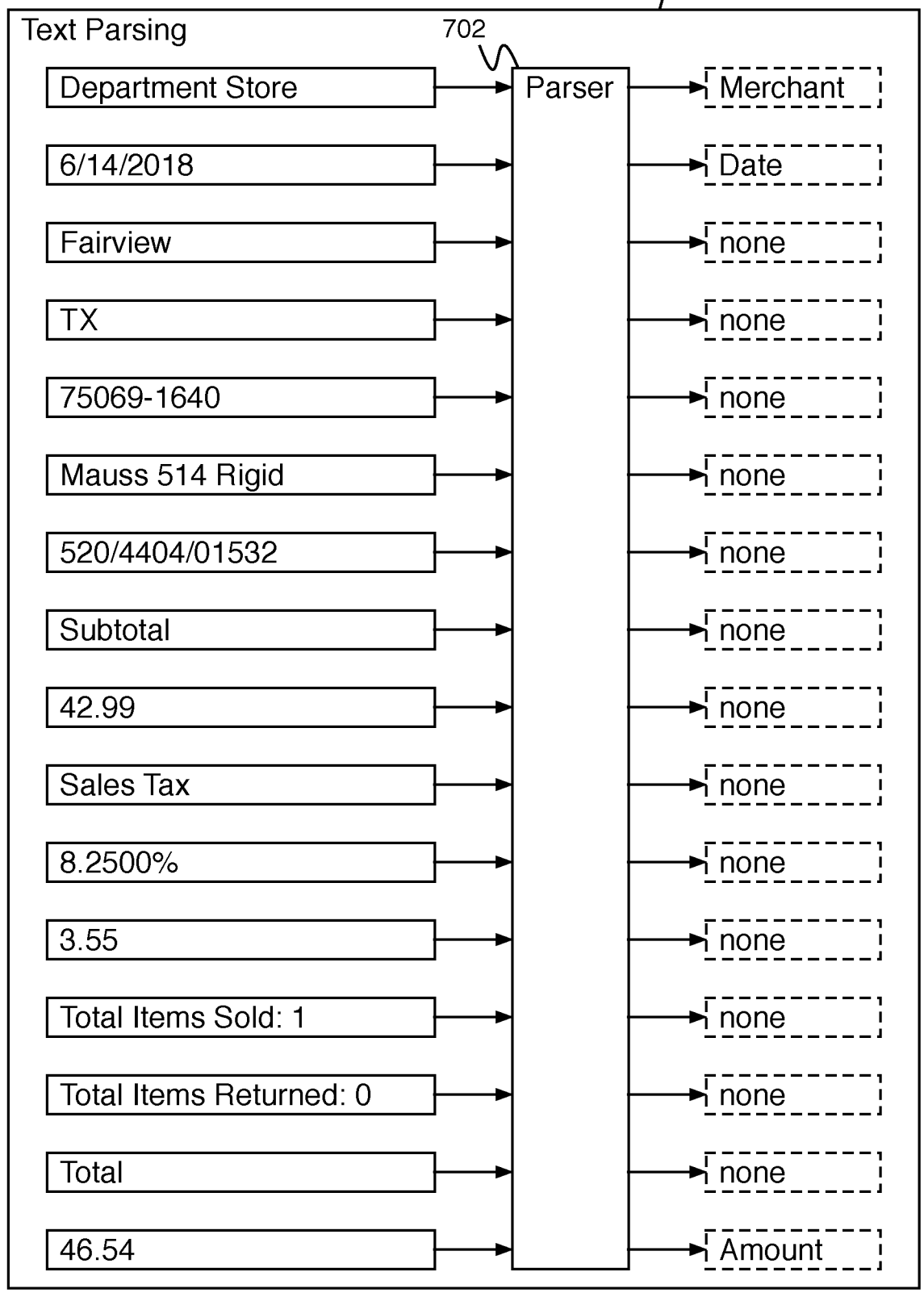
FIG. 7 is a block diagram illustrating an embodiment of a system for text parsing.

FIG. 7 is a block diagram illustrating an embodiment of a system for text parsing. In some embodiments, text parsing 700 comprises text parsing 410 of FIG. 4. In the example shown, text parsing 700 comprises parser 702. Parser 702 comprises a neural network system, a machine learning system, a rule-based system, a combination of parsing systems, or any other appropriate parsing system. In the example shown, parser 702 receives as input a set of words determined by processing a document using a text detection system and a text reading system. For each word, parser 702 determines whether the word comprises a merchant for the document, a date for the document, an amount for the document, or none of the above.

Figure 8:
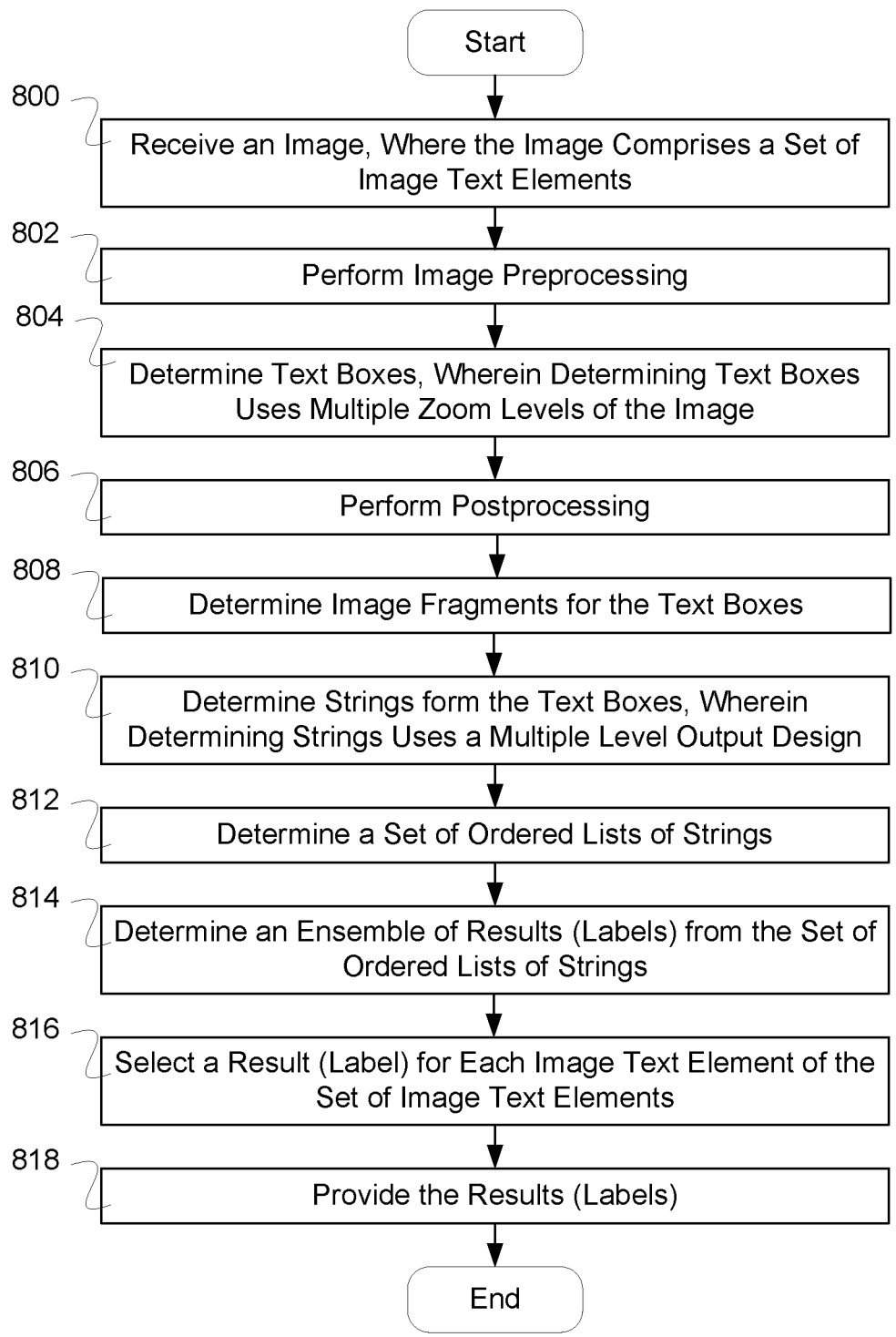
FIG. 8 is a flow diagram illustrating an embodiment of a process for document parsing.

FIG. 8 is a flow diagram illustrating an embodiment of a process document parsing. In some embodiments, the process of FIG. 8 is executed by document parsing application 208 of FIG. 2. In the example shown, in 800, an image is received, wherein the image comprises a set of image text elements. For example, the image comprises image text elements of multiple different sizes, multiple different fonts, positioned at arbitrary locations around the image (e.g., not necessarily arranged in a simple ordering of rows), aligned at arbitrary angles (e.g., either intentionally or as a result of haphazard image capture, wrinkled paper, etc.), or any other appropriate type of image text elements. In 802, image preprocessing is performed. For example, image preprocessing comprises image scaling, image rotation, image filtering, image enhancement, etc. In 804, text boxes are determined, wherein determining text boxes uses multiple zoom levels of the image. For example, text boxes are determined by text detection 500 of FIG. 5. Multiple zoom levels of the image are used to determine multiple text boxes for each image text element of the image (e.g., one text box is determined for each image text element for each zoom level). In 806, postprocessing is performed. For example, postprocessing comprises image filtering, image sharpening, image scaling, removing low-confidence boxes, merging overlapping boxes, sorting boxes, etc. In 808, image fragments are determined for the text boxes. For example, determining image fragments for the text boxes comprises cutting the image fragment corresponding to each text box from the image. In 810, strings are determined from the text boxes, wherein determining strings uses a multiple level output design. For example, strings are determined from the text boxes using one or more instances of text reading 600 of FIG. 6. For example, using a multiple level output design comprises using multiple instances of a text reading system, wherein each instance utilizes a different model (e.g., wherein the different models are trained on different data, wherein the different models are optimized for different data types, wherein the different models comprise models received from different sources, etc.). The multiple level output design is utilized to determine multiple strings from each text box (e.g., by detecting text using the multiple instances of text detection on each string). The number of strings determined is at most the product of the number of image text elements, the number of zoom levels of the image, and the number of levels of output of the text determination.

In 812, a set of ordered lists of strings is determined. For example, an ordered list of strings comprises a set of strings comprising one string associated with each image text element, wherein each string is processed using the same zoom level and using the same level output for text detection, and the strings are ordered corresponding to the order of the image text elements in the image. In 814, an ensemble of results (labels) is determined from the set of ordered lists of strings. For example, labels are determined by text parsing 700 of FIG. 7. For example, labels are determined independently for each ordered list of strings of the set of ordered lists of strings. In various embodiments, determining labels for an ordered list of strings comprises applying labels of a set of labels to each string of the list of strings (e.g., potentially applying a label to multiple strings), or applying each label of a set of labels to one string of the list of strings (e.g., potentially leaving one or more strings without a label). In various embodiments, labels are determined from the strings using a model-based algorithm (e.g., a machine learning algorithm, a neural network, etc.), a rule-based algorithm (e.g., a set of heuristics), or a combination of a model-based algorithm and a rule-based algorithm. In 816, a result (label) is selected for each image text element of the set of image text elements. For example, selecting a label comprises determining labels from the multiple label determinations of 814. For example, labels are selected by voting (e.g., determining the label most commonly applied to each element of the set of image text elements, or determining the image text element most commonly identified with each label of the set of labels). In the event voting is not satisfactory, labels are determined using a heuristic. For example, determining a label using a heuristic comprises choosing the label with the latest date to label as the image date, choosing the label with the highest amount to label as the image amount, or choosing the first occurring merchant name to label as the image merchant. In 818, the results (labels) are provided. For example, the results or labels are provided in the actual value in the correct format. In some embodiments, the strings associated with the labels are additionally provided. For example, one ordered list of strings of the set of ordered lists of strings is provided (e.g., the ordered list of strings that has the most labels in common with the selected labels is provided).

Figure 9:
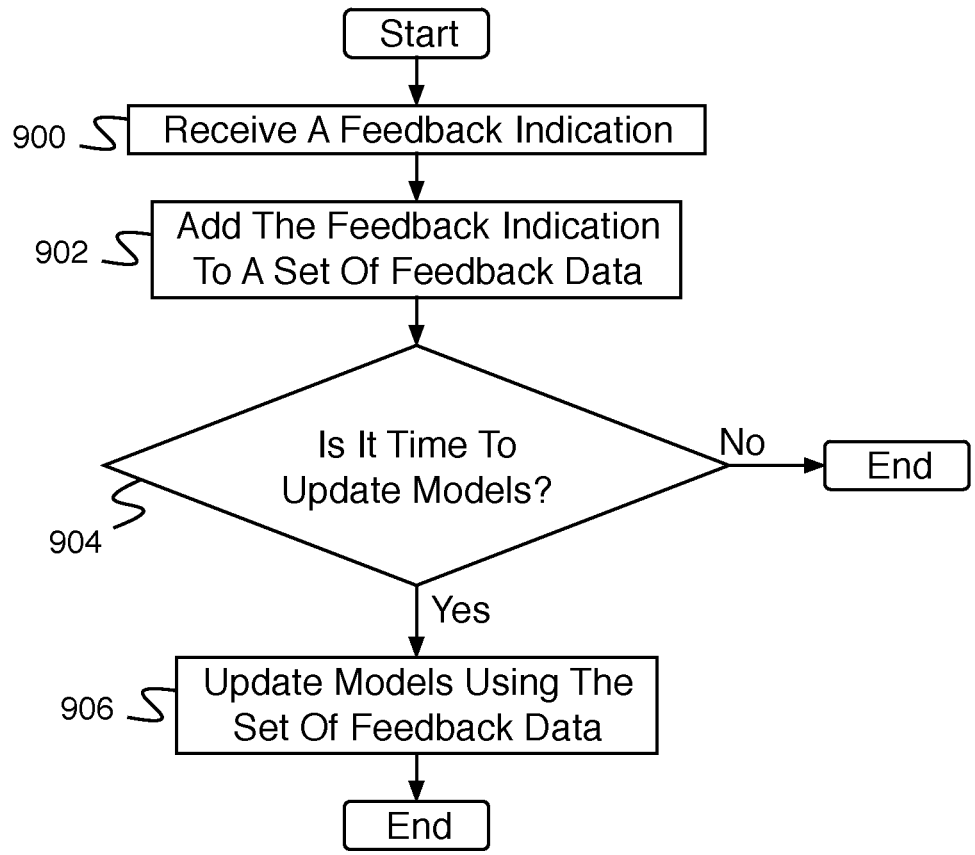
FIG. 9 is a flow diagram illustrating an embodiment of a process for updating models.

FIG. 9 is a flow diagram illustrating an embodiment of a process for updating models. In some embodiments, the process of FIG. 9 is executed by model builder 414 of FIG. 4. In the example shown, in 900, a feedback indication is received. For instance a feedback indication comprises an indication of an incorrect decision previously made by a process for document parsing, along with an indication of the correct decision. In 902, the feedback indication is added to a set of feedback data. In 904, it is determined whether it is time to update models. For example, models are updated, once a day, once a week, once every 10 feedback indications received, etc. In the event it is determined that it is not time to update models, the process ends (e.g., and models are updated in response to a later execution of the process). In the event it is determined that it is time to update models, control passes to 906. In 906, models are updated using the set of feedback data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for document parsing, comprising:
an interface configured to receive an image; and
a processor configured to:
 determine text boxes, wherein determining text boxes comprises to:
  determine more than one set of text boxes, wherein each set of text boxes of the more than one set of text boxes is determined using a different zoom level of the image; and
  merge text boxes of the more than one set of text boxes that overlap by more than a threshold amount to obtain a merged set of output text boxes for the image;
 determine image fragments of the image corresponding to the merged set of output text boxes;
 determine strings from the image fragments, wherein determining strings uses a multiple level output design;
 determine labels from the strings; and
 provide the labels.

2. The system of claim 1, wherein the more than one set of text boxes comprises more than two sets of text boxes.

3. The system of claim 2, wherein determining the text boxes uses a full resolution zoom level based on an input, a scaled up resolution zoom level based on the input, and a scaled down resolution zoom level based on the input.

4. The system of claim 1, wherein determining text boxes comprises determining a center, a width, a height, and an angle for a text box.

5. The system of claim 4, wherein determining an angle for the text box comprises determining two metrics describing the orientation of the text box and determining a goodness of fit based at least in part on the correspondence of the two metrics.

6. The system of claim 1, wherein the processor is additionally configured to map the text boxes of the more than one set of text boxes to a same scale.

7. The system of claim 1, wherein text boxes are determined using a multilayer neural network.

8. The system of claim 1, wherein determining strings using a multiple level output design comprises determining strings multiple times using different models.

9. The system of claim 1, wherein the processor is additionally configured to determine a set of ordered lists of strings.

10. The system of claim 1, wherein determining labels comprises determining labels for each ordered list of strings of a set of ordered lists of strings.

11. The system of claim 1, wherein the image comprises a set of image text elements, wherein determining labels comprises selecting a label from a set of labels determined for an image text element of the set of image text elements.

12. The system of claim 11, wherein selecting the label comprises voting for the label and selecting the label using one of the following: selecting using majority rule, selecting using a supermajority rule, or selecting using a weighted voting.

13. The system of claim 1, wherein determining labels comprises determining a label using a heuristic.

14. The system of claim 13, wherein determining a label using a heuristic comprises choosing the label with a latest date to label as the image date, choosing the label with a highest amount to label as the image amount, or choosing a first occurring merchant name to label as the image merchant.

15. The system of claim 1, wherein determining labels for the strings comprises determining labels using a model-based algorithm, a rule-based algorithm, or a combination of a model-based algorithm and a rule-based algorithm.

16. The system of claim 1, wherein the processor is further configured to:
receive feedback data; and
update models based at least in part on the feedback data.

17. The system of claim 1, wherein the processor is further configured to perform a post-processing algorithm on the output text boxes, wherein the post-processing algorithm comprises one or more of: removing low-confidence output text boxes, and sorting output text boxes.

18. The system of claim 1, wherein determining text boxes additionally comprises determining labels for the text boxes.

19. A method for document parsing, comprising:
receiving an image;
determining text boxes, using a processor, wherein determining text boxes uses multiple zoom levels of the image; comprising:
determining more than one set of text boxes, wherein each set of text boxes of the more than one set of text boxes is determined using a different zoom level of the image; and
merging text boxes of the more than one set of text boxes that overlap by more than a threshold amount to obtain a merged set of output text boxes for the image;
determining image fragments of the image corresponding to the merged set of output text boxes;
determining strings from the image fragments, wherein determining strings uses a multiple level output design;
determining labels from the strings; and
providing the labels.

20. A computer program product for document parsing, the computer program product being embodied in a non-transitory computer readable storage medium and comprising computer instructions for:
receiving an image;
determining text boxes, comprising:
determining more than one set of text boxes, wherein each set of text boxes of the more than one set of text boxes is determined using a different zoom level of the image; and
merging text boxes of the more than one set of text boxes that overlap by more than a threshold amount to obtain a merged set of output text boxes for the image;
determining image fragments of the image corresponding to the merged set of output text boxes;
determining strings from the image fragments, wherein determining strings uses a multiple level output design;
determining labels from the strings; and
providing the labels.

21. The system of claim 1, wherein determining image fragments of the image comprises cutting an image fragment corresponding to an output text box of the merged set of output text boxes from the image.

* * * * *